United States Patent Office 3,069,382
Patented Dec. 18, 1962

3,069,382
REDUCTION OF WATER-SOLUBLE PEROXIDES IN A GRAFT COPOLYMERIZATION PROCESS
Nikolai S. Nikolov and Lloyd A. McLeod, Sarnia, Ontario, Canada, assignors to Polymer Corporation Limited, Sarnia, Ontario, Canada
No Drawing. Filed Oct. 28, 1957, Ser. No. 692,544
Claims priority, application Canada Nov. 3, 1956
17 Claims. (Cl. 260—45.5)

This invention relates to the grafting of polymerizable compounds on to pre-formed polymers. By "grafting" is meant the addition of the polymerizable compounds as branches to the previously formed long-chain molecules of said pre-formed polymer. By "pre-formed polymers" is meant both synthetically prepared pre-formed organic polymers and naturally occurring pre-formed organic polymers, the latter being either in their native state or in a chemically modified form. The invention is more particularly concerned with reducing the amount of undesirable homopolymerization which takes place during the grafting reaction.

It is known that the properties of polymeric materials depend directly on the nature of the molecules which form the polymeric structure, on the number of molecular units joined together in this structure, and on the manner in which such molecular units are joined. It has been theorized that if one or more monomeric materials could be added as branches to a pre-formed polymer, a modified product having predetermined characteristics could be prepared.

In copending United States application Serial Number 497,427 of J. Borunsky and H. L. Williams, filed March 28, 1955 there is disclosed a method for grafting polymerizable compounds as branches to various synthetically prepared pre-formed organic polymers by oxidizing such pre-formed polymers with gaseous oxygen or ozone, then polymerizing the oxidized polymer with the polymerizable compounds..

The primary object of the present invention is to provide a process for inhibiting homopolymer formation during the grafting-polymerization of polymerizable monomers with pre-formed polymers previously oxidized with gaseous oxygen or ozone by the process disclosed in the above-identified applications.

It has now been found that the above-described oxidation of aqueous dispersions of pre-formed polymers not only results in the formation of polymeric species capable of initiating a grafting-polymerization reaction but also in the simultaneous production of water-soluble- homopolymerization initiating compounds. Deactivation of these water-soluble compounds before the grafting step has been found to result in a reduction of homopolymer formation.

One method for deactivating or destroying water-soluble peroxygen compounds is by the use of acidifying procedures. When applied to an aqueous dispersion in the form of a latex the acidifying method is frequently unsatisfactory as in many cases the latex coagulates. However, the method may be successfully applied to those latices which are stable to acid coagulation.

An alternative method for deactivating or destroying water-soluble peroxygen compounds is by decomposing these compounds through the action of heat. In a system wherein peroxygen compounds are formed by the oxygen or ozone treatment of latex containing pre-formed polymers, the raising of the temperature of the system is unsatisfactory. The higher temperatures required to destroy the undesirable water-soluble homopolymerization initiating species of peroxygen compounds will also destroy the water insoluble polymeric species of peroxygen compounds which are needed to initiate the grafting polymerization reaction.

It has been found that the addition of a water-soluble reducing agent to a latex of a pre-formed polymer which has been oxidized by treatment with gaseous oxygen or ozone is a suitable method for destroying the water soluble, homopolymerization initiating peroxygen compounds contained therein. Suitable water-soluble reducing agents include sodium formaldehyde sulfoxylate, aldehydes such as formaldehyde, amines such as triethylenetetramine and inorganic salts of strong acids with multiple valency metals in one of their lower valence forms such as ferrous sulfate. It should be understood that, when the latex is one which has been prepared by using ferrous sulfate or other reducing agent as one of the components of a redox-type polymerization activator, some of the reducing agent will remain as such in solution at the completion of the reaction but that the subsequent oxidation of the latex with ozone or oxygen will oxidize the reducing agent to an inactive form. Therefore, no reducing agent is available for deactivating or destroying the water-soluble homopolymerization initiating peroxygen compounds formed during the oxidation step.

The present invention therefore, provides an improvement in the process of grafting a polymerizable organic compound containing a $CH_2=C<$ group onto a substantially straight chain preformed polymer of a vinylidene monomer which comprises effecting the following steps in sequence:

(a) Polymerizing said vinylidene monomer in aqueous emulsion to form a latex of a substantially straight chain preformed polymer of said vinylidene monomer;

(b) Stripping unreacted monomer from said latex of preformed polymer;

(c) Contacting said latex of preformed polymer with an oxidizing gas selected from the group consisting of oxygen, ozone and mixtures of oxygen and ozone thereby to form a peroxide of said straight chain preformed polymer;

(d) Adding a water soluble reducing agent, preferably in the presence of a water soluble sequestering agent, to the latex of peroxidized preformed polymers thereby to deactivate any water soluble peroxides formed during the oxidation treatment of said preformed polymer; and (e) After said deactivation step has been completed dispersing said polymerizable compound containing a $CH_2=C<$ group through said latex of peroxidized preformed polymer thereby causing said peroxidized preformed polymer to contact said dispersed polymerizable compound and thus initiate the grafting reaction, said peroxidized preformed polymer being the sole polymerization initiating species present in the system.

In the process of the present invention the addition of ionizable, water-soluble salts as reducing agents exerts a tendency towards destabilization of many latices. Since the amount of electrolyte required to cause latex destabilization is dependent on the character of the latex, the amount used is determined by the necessity to avoid such excessive destabilization. The maximum amount that can be used for any particular latex system can readily be determined.

It has also been discovered, as a preferred form of the invention, that a chelating or sequestering agent may be used in conjunction with the electrolyte forming, water-soluble reducing salts. More salt may thus be used with resultant speedier deactivation of the homopolymerization initiating species along with reduced tendency towards undesirable coagulation.

Suitable chelating agents which may be used include the alkali metal salts of pyrophosphates, polyphosphates and alkali metal salts of ethylene diamine tetra-acetic acid.

The pre-formed polymers which may be treated by the method of this invention are disclosed in greater detail in copending United States application Serial No. 497,427 of Borunsky et al. filed March 28, 1955. Examples of such pre-formed polymers as disclosed by the above-identified applications are synthetically prepared pre-formed organic polymers such as those prepared by polymerizing a diolefin such as butadiene-1,3 or isoprene alone or with a copolymerizable monomer such as styrene, alpha methyl styrene, acrylonitrile, etc.

Polymerizable monomers which may be grafted to the pre-formed polymers are more fully disclosed in the above-identified copending applications and include the open-chain conjugated dienes such as butadiene-1,3, isoprene, chloroprene, piperylene and the like; aryl olefins such as styrene, alpha alkyl styrenes such as alpha methyl styrene, nuclearly substituted styrenes such as p-chlorostyrene, and p-methyl styrene, vinyl naphthalene and the like; acrylic and substituted acrylic acids and their esters, nitriles and amides such as acrylic acid, methacrylic acid, methyl acrylate, methyl methacrylate, acrylonitrile, methacrylamide and the like; vinylpyridine; vinyl ethers and vinyl ketones, vinyl and vinylidene chlorides and the like; trienes such as myrcene, and compounds containing both olefinic and acetylenic bonds such as vinyl acetylenes.

Although the following examples are given to illustrate the present invention, it should be understood that the basic grafting process of which the present invention is an improvement is fully described by the numerous examples included in the above-identified copending applications. The process and examples described above are to be incorporated into the present invention by reference.

EXAMPLE 1

*Effect of Oxidizing the Water on Polymerizations*

100 grams of distilled water were placed into a 500 ml. graduate and a stream of oxygen containing about 9.5 milligrams of ozone per liter was bubbled through the water at the rate of 0.4 liter per minute, for 45 minutes. Nitrogen was then bubbled through the water for 15 minutes to flush out unreacted oxygen and ozone.

Water treated in the above manner was used to prepare polymerization emulsifier and activator solutions. The emulsifier solution was made up by dissolving 2.0 grams of Nacconal NRSF in 76.8 grams of water. Nacconal NRSF is a sodium alkyl aryl sulfonate dispersing agent. The activator solution was prepared by weighing the following ingredients into a 100 ml. volumetric flask and dissolving and making up to the mark with the treated water:

0.57 gram sodium formaldehyde sulfoxylate
0.10 gram ferrous sulfate heptahydrate
0.12 gram ethylenediamine tetra-acetic acid
0.35 gram tri-sodium phosphate 78.8 grams of the emulsifier solution were placed into a 7-oz. polymerization bottle. To the bottle were also added 40.0 grams of styrene. The bottle was capped and placed into a polymerizer, held at 55° F., for 15 minutes to bring its temperature down to 55° F. 3.2 mls. of activator solution, prepared as described above, were injected into the bottle by means of a syringe, following which the bottle contents were agitated by end over end tumbling in the polymerizer for 18 hours. No modifier or catalyst was added.

There was no reaction.

This result indicates that no peroxygen compounds capable of catalyzing a polymerization reaction are formed when oxygen-ozone mixed gases are bubbled through water.

EXAMPLE 2

*Effect of Oxidizing the Soap Solution on Polymerization*

An emulsifier solution containing 2.5 grams of Nacconal NRSF per 100 grams of solution was made up with distilled water. 1000 grams of this solution were placed into a 500 ml. graduate and treated with oxygen-ozone gas and with nitrogen as described in Example 1.

78.8 grams of the oxidized emulsifier solution were placed into a 7-oz. polymerization bottle to which were also added 40.0 grams of styrene and 3.2 mls. of activator solution prepared as described in Example 1. Polymerization was allowed to proceed for 17 hours at 55° F. Although no catalyst was used, a conversion of 100% was obtained.

The result in Example 1 shows that the water component of the soap solution could not have supplied the catalyst for the reaction. In the present case it must be concluded that the reaction was due to the presence of emulsifier peroxygen compounds formed when oxygen-ozone gas was bubbled through the emulsifier solution.

EXAMPLE 3

*Effect of Addition of Reducing Agent to Oxidized Soap Solutions*

An emulsifier solution containing 2.5 grams of Nacconal NRSF per 100 grams of solution was made up with distilled water. 100.0 grams of this solution were placed into a 500 ml. graduate and treated with oxygen-ozone gas and with nitrogen as described in Example 1.

73.8 grams of this oxidized emulsifier solution were placed into a 7-oz. polymerization bottle to which were also added 4.0 grams of triethylene-tetramine reducer. The contents were agitated for 15 minutes to assure thorough mixing following which 40.0 grams of styrene were added to the bottle. The bottle was capped, cooled for 15 minutes in a polymerizer held at 55° F., then 3.2 mls. of activator solution, prepared as described in Example 1, were injected by means of a syringe. The reaction was allowed to proceed for 18 hours at 55° F. The conversion obtained in this case was only 9.6% as compared to the 100% conversion obtained in Example 2.

This result indicates that the step of mixing the water soluble triethylene-tetramine reducer with the oxidized emulsifier solution before polymerization destroyed most of the polymerization initiating ability of the emulsifier peroxygen compound formed by bubbling a mixed oxygen-ozone gas through the emulsifier solution.

EXAMPLE 4

*Effect of Adding Reducing Agent Mixed with a Sequestering Agent to Oxidized Soap Solutions*

The procedure of Example 3 was repeated but in this case the triethylene-tetramine reducing agent was replaced by a sequestered reducing agent prepared as follows:

The following ingredients were weighed into a 100 ml. volumetric flask and dissolved in distilled water:

0.80 gram ferrous sulfate heptahydrate
0.80 gram ethylene diamine tetra-acetic acid sequestering agent
1.60 gram trisodium phosphate The volumetric flask was made up to volume with distilled water and 5.0 mls. of this solution were mixed with the emulsifier solution and agitated as in Example 3.

The conversion obtained in this case was zero as compared with the 9.6% of Example 3 and the 100% of Example 2.

This result indicates that a sequestered reducer is an even more effective means of destroying the polymerization initiating ability of the emulsifier peroxygen compounds formed by bubbling a mixed oxygen-ozone gas through the emulsifier solution.

EXAMPLE 5

*Grafting on Oxidized Latex Treated With an Amine Reducing Agent Preparation of the Base Polymer Latex*

A base polymer latex was prepared by polymerizing butadiene-1,3 in the following recipe in which the quantities are in parts by weight:

RECIPE 1

|  | Parts |
|---|---|
| Monomer—Butadiene-1,3 | 100.0 |
| Reaction medium—Water | 200.0 |
| Emulsifier solution— | |
|    Potassium stearate | 4.7 |
|    Trisodium phosphate | 0.5 |
|    Potassium chloride | 0.2 |
|    Ethylene diamine tetra-acetic acid | 0.02 |
| Activator solution— | |
|    Ferrous sulfate heptahydrate | 0.007 |
|    Sodium formaldehyde sulfoxylate | 0.04 |
|    Ethylene diamine tetra-acetic acid | 0.008 |
|    Trisodium phosphate | 0.025 |
|    Diisopropylbenzenehydroperoxide | 0.044 |
| Catalyst—Diisopropylbenzenehydroperoxide | 0.044 |
| Modifier—Mixed tertiary mercaptan ($C_{12}$:$C_{14}$:$C_{16}$::3:1:1) | 0.32 |

Polymerization temperature—55° F.
Reaction time—12 hours in 5-gallon reactor
Shortstop—nil—latex was degassed and found to contain 25.0% solids.

100.0 grams of this latex were placed into a 500 ml. graduate and a stream of oxygen containing about 9.5 milligrams of ozone per liter of gas was bubbled through the latex at the rate of 0.4 liter per minute, for 45 minutes. Nitrogen was then bubbled through the latex for 15 minutes to flush out excess oxygen and ozone.

80.0 grams of the above oxidized latex were placed into a 7-oz. polymerization bottle and 4.0 grams of triethylene-tetramine were added to the latex. The bottle was stoppered and agitated for 15 minutes to assure thorough mixing of the contents and destruction of any water-soluble peroxygen compounds. 18.7 grams of an 11.3% Nacconal NRSF solution in water were added to the bottle followed by 20.0 grams of styrene monomer. The bottle was capped, placed in a 55° F. polymerizer to reduce the temperature of its contents to the desired point and 3.2 mls. of activator solution prepared as described in Example 1 were injected into the bottle by means of a syringe, following which the bottle contents were agitated by end over end tumbling in the polymerizer for 18 hours. No modifier or catalyst was added. A conversion of 44.6% based on the added styrene was obtained.

This result shows that an oxidized polymer latex, treated with a water-soluble reducing agent for a short period of time to destroy any water-soluble peroxygen compounds, is capable of initiating a polymerization reaction in the absence of added oxidizing catalyst and thus allow growth to begin directly from the backbone.

EXAMPLE 6

*Grafting on Oxidized Latex Treated With a Sequestered Reducing Agent*

Example 5 was repeated except that 13.7 grams of a 16.1% Nacconal NRSF solution were used as emulsifier, methyl methacrylate was used as the added monomer and 5.0 mls. of reducer, prepared as described in Example 4, were used as reducing agent.

A conversion of 100%, based on the added methyl methacrylate, was obtained.

This result indicates that a ferrous sulfate reducing agent containing a sequestering agent for the iron may be used as the water-soluble reducing agent.

EXAMPLE 7

*Effect of Reducer Treatment of Latex on Resulting Products*

Example 6 was repeated in duplicate except that the ratio of added methyl methacrylate monomer to butadiene polymer was 30/70 and that the reducer treatment was omitted in one of the duplicates. A monomer conversion of 100% was obtained in each case.

Each sample of latex was coagulated with methanol and the resulting polymers were dried at 30° C. under 28 inches of vacuum for 16 hours. 5.0 grams of each polymer were extracted with acetone in a Soxhlet extractor for 48 hours.

The polymer sample obtained from the oxidized latex which was treated with sequestered ferrous sulfate reducing solution lost 10% of its weight on extraction, while the polymer obtained from the untreated oxidized latex lost 18%.

It is known that polymeric butadiene-1,3 is not soluble in acetone while polymethyl methacrylate is acetone soluble. The 80% higher content of acetone extractable material in the second case must be attributed to the presence of polymethyl methacrylate whose polymerization was initiated by the undestroyed water-soluble emulsifier peroxygen compounds.

EXAMPLE 8

*Effect of Oxidizing Treatment of Latex on Resulting Products*

A 100-gram sample of polybutadiene latex was prepared and oxidized as described in Example 5 while another 100-gram sample of the same latex was left unoxidized.

Each sample was coagulated with methanol, blotted dry, then part of each polymer was dissolved in benzene to give two 5% solutions each weighing 200 grams. 20.0 grams of styrene monomer were added to each benzene solution and the viscosities were measured immediately, at 25° C., on a Brookfield synchroelectric viscometer, multi-speed model LVT. The two solutions were then heated to 50° C. and held at this temperature for 18 hours. After cooling to 25° C. the viscosity of each solution was again measured.

The results are summarized in the following table. All viscosities are in centipoise units.

TABLE 1

| R.p.m. | 60 | 30 | 12 | 6 | 3 | 1.5 |
|---|---|---|---|---|---|---|
| Oxidized polymer before heating | 488 | 680 | 1,050 | 1,400 | 1,880 | 2,880 |
| Oxidized polymer after heating | 120 | 150 | 150 | 160 | 170 | 170 |
| Unoxidized polymer before heating | 900 | 925 | 925 | 950 | 1,000 | 1,000 |
| Unoxidized polymer after heating | 978 | 1,024 | 1,030 | 1,050 | 1,120 | 1,200 |

If block polymerization had occured with the oxidized sample an increase in the solution viscosities would have resulted because of the increase in molecular chain length. The sharply lower solution viscosities point to a branched structure, i.e. a graft copolymer resulting from the reactive sites produced on the polymer backbone by the oxidative treatment. The slight rise in the viscosities obtained with the unoxidized polymer indicates that some thermo polymerization of the monomer took place.

In this specification the term "homopolymerization" is meant to designate all non-grafting polymerization, i.e. polymerization which results in the formation of polymer which is not attached to the oxidized pre-formed polymer.

What we claim is:
1. In a process for grafting a polymerizable compound onto a substantially straight chain preformed polymer of a vinylidene monomer which consists of polymerizing said vinylidene monomer in aqueous emulsion to form a latex of a substantially straight chain preformed polymer, stripping unreacted monomer from said latex, contacting said stripped latex with an oxidizing gas selected from the group consisting of oxygen, ozone and mixtures of oxygen and ozone thereby to form a peroxide of said straight chain preformed polymer, dispersing said polymerizable compounds containing a $CH_2=C<$ group in its molecular structure throughout said latex of peroxidized preformed polymer causing said peroxidized preformed polymer to initate the grafting polymerization of said dispersed polymerizable compound in the absence of any added compound capable of causing said polymerizable compound containing a $CH_2=C<$ group to polymerize the improvement comprising reducing the amount of homopolymer formed during the grafting polymerization by deactivating the water-soluble peroxides formed during the oxidation step by contacting the stripped latex with a water-soluble reducing agent subsequent to the oxidation step but prior to dispersing the polymerizable compound containing a $CH_2=C<$ group throughout said latex.

2. The improvement of claim 1 wherein the preformed polymer of a vinylidene monomer is a polymer selected from the group consisting of butadiene-1,3 homopolymer, 2-methylbutadiene-1,3 homopolymer, 2,3-dimethylbutadiene-1,3 homopolymer, 2-chlorobutadiene-1,3 homopolymer, butadiene-1,3/styrene copolymer, butadiene-1,3/styrene/divinylbenzene copolymer, butadiene-1,3/styrene/2-vinylpyridine copolymer, butadiene-1,3/acrylonitrile copolymer, 2-methylbutadiene-1,3/styrene copolymer and 2-methylbutadiene-1,3/acrylonitrile copolymer.

3. The improvement of claim 2 wherein the polymerizable compound containing a vinylidene group in its molecular structure is one selected from the group consisting of butadiene-1,3, 2-methylbutadiene-1,3, 2,3-dimethylbutadiene-1,3, styrene, α-methylstyrene, acrylic acid, acrylonitrile, methyl methacrylate, acrylamide, 2-chlorobutadiene-1,3, 2-vinyl pyridine and divinylbenzene.

4. The improvement of claim 1 wherein the preformed polymer is a copolymer of butadiene-1,3 with styrene and the polymerizable compound is acrylonitrile.

5. The improvement of claim 1 wherein the preformed polymer is a copolymer of butadiene-1,3 with styrene and the polymerizable compound is styrene.

6. The improvement of claim 1 wherein the preformed polymer is a copolymer of butadiene-1,3 with styrene and the polymerizable compound is butadiene-1,3.

7. The improvement of claim 1 wherein the preformed polymer is a homopolymer of butadiene-1,3 and the polymerizable compound is styrene.

8. The improvement of claim 1 wherein the preformed polymer is a homopolymer of butadiene-1,3 and the polymerizable compound is acrylonitrile.

9. The improvement of claim 1 wherein the water-soluble peroxides are deactivated by contacting the stripped latex with a water-soluble reducing agent and a water-soluble sequestering agent.

10. The improvement of claim 9 wherein an ionizable ferrous compound is the water-soluble reducing agent.

11. The improvement of claim 9 wherein the sequestering agent is an alkali metal salt of ethylene diamine tetraacetic acid.

12. The improvement of claim 9 wherein the water-soluble reducing agent is ferrous sulfate and the sequestering agent is an alkali metal salt of ethylene diamine tetraacetic acid selected from the group consisting of sodium and potassium salts.

13. The improvement of claim 9 wherein the preformed polymer is a copolymer of butadiene-1,3 with styrene and the polymerizable compound is acrylonitrile.

14. The improvement of claim 9 wherein the preformed polymer is a copolymer of butadiene-1,3 with styrene and the polymerizable compound is styrene.

15. The improvement of claim 9 wherein the preformed polymer is a copolymer of butadiene-1,3 with styrene and the polymerizable compound is butadiene-1,3.

16. The improvement of claim 9 wherein the preformed polymer is a homopolymer of butadiene-1,3 and the polymerizable compound is styrene.

17. The improvement of claim 9 wherein the preformed polymer is a homopolymer of butadiene-1,3 and the polymerizable compound is acrylonitrile.

References Cited in the file of this patent

UNITED STATES PATENTS

| | | |
|---|---|---|
| 2,620,324 | Coover et al. | Dec. 2, 1952 |
| 2,754,282 | Stoops et al. | July 10, 1956 |
| 2,762,790 | Greene | Sept. 11, 1956 |
| 2,804,443 | Fordham | Aug. 27, 1957 |
| 2,837,496 | Vandenberg | June 3, 1958 |
| 2,911,398 | Vandenberg | Nov. 3, 1959 |

FOREIGN PATENTS

| | | |
|---|---|---|
| 1,101,682 | France | Apr. 27, 1955 |
| 154,917 | Australia | Jan. 27, 1954 |

OTHER REFERENCES

Boundy-Boyer: "Styrene," Reinhold Pub. Corp. (New York), 1952, page 252.

Metz et al.: "Journal of Polymer Science," volume 16, pages 345–355 (1955).